(12) United States Patent
Recker et al.

(10) Patent No.: US 12,376,030 B2
(45) Date of Patent: Jul. 29, 2025

(54) LOW POWER HIGH DEFINITION WIRELESS MEDIA TRANSPORT

(71) Applicant: Avago Technologies International Sales Pte. Limited, Singapore (SG)

(72) Inventors: David Lee Recker, Sunnyvale, CA (US); Brandon B. Bae, San Diego, CA (US); Hea Joung Kim, Irvine, CA (US); Mark Gonikberg, San Jose, CA (US); Shawn Ding, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/675,690

(22) Filed: May 28, 2024

(65) Prior Publication Data

US 2024/0323837 A1    Sep. 26, 2024

Related U.S. Application Data

(63) Continuation of application No. 17/307,205, filed on May 4, 2021, now Pat. No. 12,035,233, which is a
(Continued)

(51) Int. Cl.
*H04W 52/02* (2009.01)
*H04L 69/14* (2022.01)
(Continued)

(52) U.S. Cl.
CPC ......... *H04W 52/0209* (2013.01); *H04L 69/14* (2013.01); *H04W 4/80* (2018.02);
(Continued)

(58) Field of Classification Search
CPC . H04W 52/0209; H04W 4/80; H04W 56/001; H04W 84/12; H04W 84/18; H04L 69/14; Y02D 30/70
See application file for complete search history.

(56) References Cited

U.S. PATENT DOCUMENTS 5,627,528 A    5/1997   Kuznicki
8,094,597 B1   1/2012   Chhabra et al.
(Continued)

FOREIGN PATENT DOCUMENTS

EP         1 569 384 A1        8/2005
WO     WO-2009/106932 A1       9/2009

OTHER PUBLICATIONS

Final Office Action on U.S. Appl. No. 15/913,583 DTD Aug. 27, 2020.
(Continued)

*Primary Examiner* — Michael Thier
*Assistant Examiner* — Nevena Zecevic Sandhu
(74) *Attorney, Agent, or Firm* — Foley & Lardner LLP

(57) ABSTRACT

In some aspects, the disclosure is directed to methods and systems for providing a hybrid low power, high bandwidth media transport protocol between media sinks and media sources by splitting control and synchronization commands to a low power communication interface, and media data to a high bandwidth unidirectional communication interface. Media sinks need not transmit via the high bandwidth unidirectional communication interface, reducing power consumption, which may be particularly beneficial for small devices with limited battery capacity such as wireless earbuds.

20 Claims, 12 Drawing Sheets

Related U.S. Application Data continuation of application No. 15/913,583, filed on Mar. 6, 2018, now Pat. No. 10,999,792.

(60) Provisional application No. 62/471,905, filed on Mar. 15, 2017.

(51) Int. Cl.
*H04W 4/80* (2018.01)
*H04W 56/00* (2009.01)
*H04W 84/12* (2009.01)
*H04W 84/18* (2009.01)

(52) U.S. Cl.
CPC .......... *H04W 56/001* (2013.01); *H04W 84/12* (2013.01); *H04W 84/18* (2013.01); *Y02D 30/70* (2020.08)

(56) References Cited

U.S. PATENT DOCUMENTS

| | | |
|---|---|---|
| 10,057,015 B1 | 8/2018 | Naim et al. |
| 2005/0282494 A1 | 12/2005 | Kossi et al. |
| 2006/0209892 A1 | 9/2006 | MacMullan et al. |
| 2006/0212911 A1 | 9/2006 | MacMullan et al. |
| 2007/0087724 A1 | 4/2007 | Jang et al. |
| 2008/0279130 A1 | 11/2008 | Lewis |
| 2008/0279163 A1 | 11/2008 | Desai |
| 2008/0279264 A1 | 11/2008 | Desai et al. |
| 2009/0323569 A1 | 12/2009 | Wentink |
| 2010/0165962 A1 | 7/2010 | Tzoreff et al. |
| 2012/0120871 A1 | 5/2012 | Jaeger |
| 2013/0176937 A1 | 7/2013 | Rolle et al. |
| 2014/0297815 A1 | 10/2014 | Rajapakse |
| 2015/0023363 A1 | 1/2015 | Hui et al. |
| 2015/0043523 A1* | 2/2015 | Luo ........................ H04B 1/713 370/330 |
| 2015/0156637 A1* | 6/2015 | Li ........................ H04W 16/14 455/454 |
| 2015/0271808 A1 | 9/2015 | Liang et al. |
| 2016/0100400 A1 | 4/2016 | Lu et al. |
| 2016/0285591 A1 | 9/2016 | Dortmund et al. |
| 2017/0019197 A1 | 1/2017 | Rajapakse et al. |
| 2017/0164397 A1 | 6/2017 | Zeng et al. |
| 2017/0310427 A1 | 10/2017 | Wakabayashi et al. |
| 2018/0007710 A1 | 1/2018 | Tanaka |
| 2018/0084456 A1 | 3/2018 | Gostev et al. |
| 2018/0248811 A1 | 8/2018 | Di Nallo et al. |
| 2018/0270854 A1 | 9/2018 | Lee et al. |

OTHER PUBLICATIONS

Final Office Action on U.S. Appl. No. 15/913,583 DTD Sep. 23, 2019.
Final Office Action on U.S. Appl. No. 17/307,205 DTD Feb. 17, 2023.
Final Office Action on U.S. Appl. No. 17/307,205 DTD Aug. 30, 2023.
Non-Final Office Action on U.S. Appl. No. 15/913,583 DTD Mar. 19, 2020.
Non-Final Office Action on U.S. Appl. No. 15/913,583 DTD Apr. 3, 2019.
Non-Final Office Action on U.S. Appl. No. 17/307,205 DTD May 26, 2023.
Non-Final Office Action on U.S. Appl. No. 17/307,205 DTD Sep. 27, 2022.
Notice of Allowance on U.S. Appl. No. 15/913,583 DTD Jan. 7, 2021.
Notice of Allowance on U.S. Appl. No. 17/307,205 DTD Feb. 28, 2024.
US Office Action on US DTD May 1, 2023.

* cited by examiner

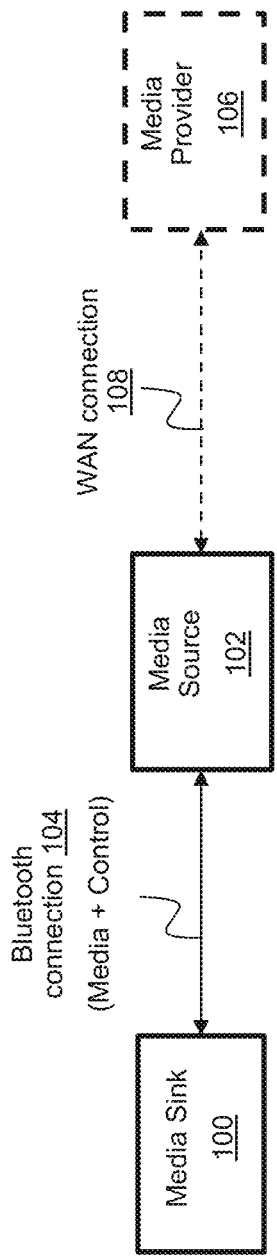
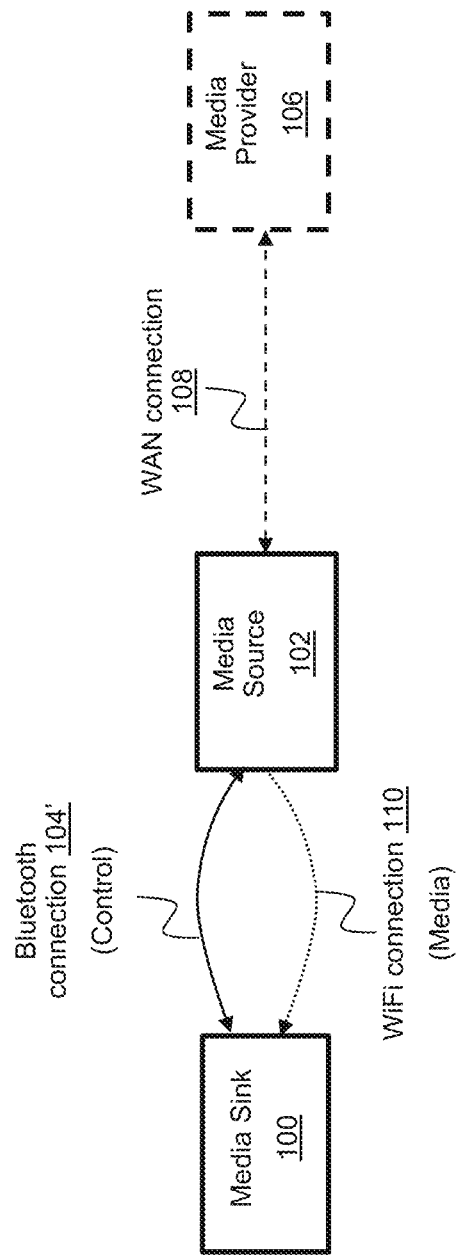

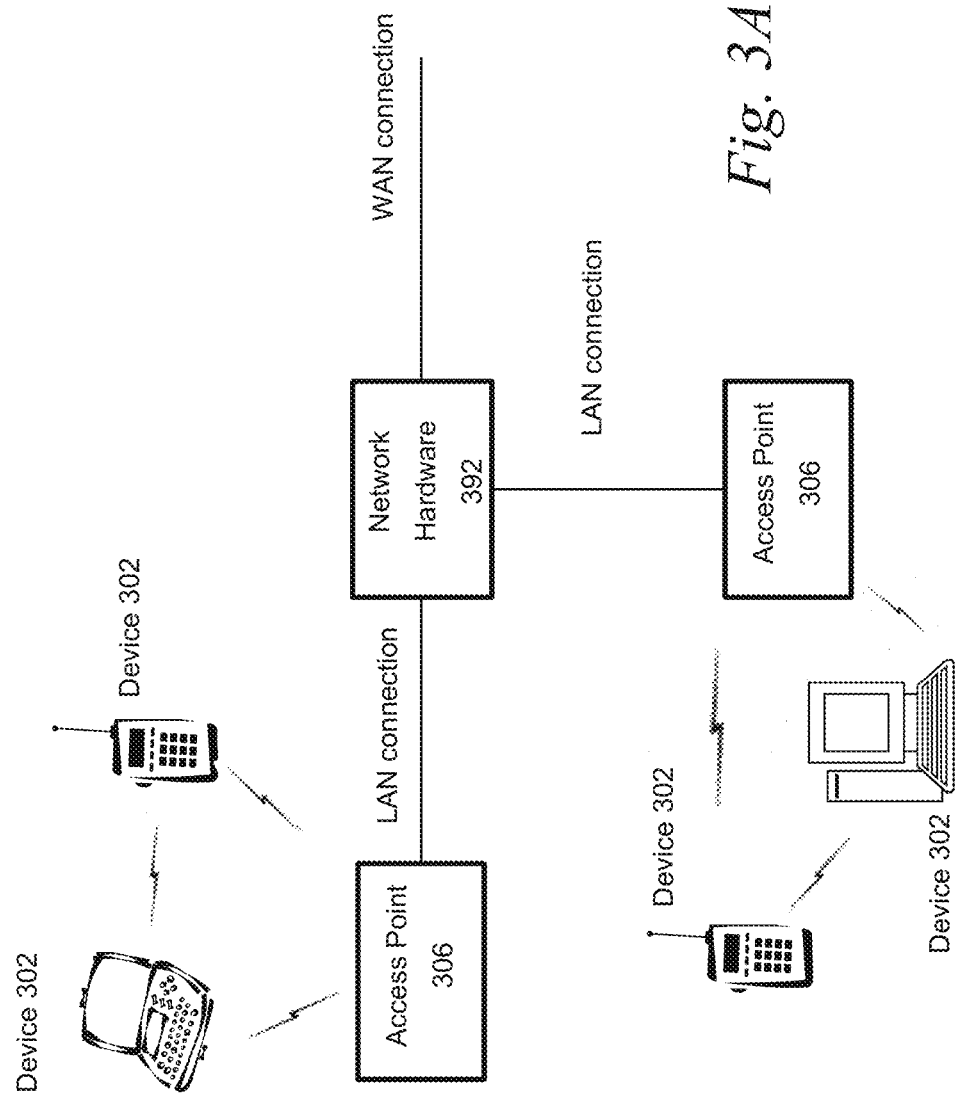

LOW POWER HIGH DEFINITION WIRELESS MEDIA TRANSPORT

RELATED APPLICATIONS

The present application claims the benefit of and priority as a continuation to U.S. Nonprovisional application Ser. No. 17/307,205, filed May 4, 2021, which the claims the benefit of priority as a continuation to U.S. Nonprovisional application Ser. No. 15/913,583, filed Mar. 6, 2018, now U.S. Pat. No. 10,999,792, issued on May 4, 2021, which claims the benefit of priority to U.S. Provisional Application No. 62/471,905, filed Mar. 15, 2017, the entirety of each of which is hereby incorporated by reference.

FIELD OF THE DISCLOSURE

This disclosure generally relates to systems and methods for wireless communications. In particular, this disclosure relates to systems and methods for communicating high definition media via a plurality of communications pathways.

BACKGROUND OF THE DISCLOSURE

Media, such as high resolution audio, may require significant amounts of bandwidth for transmission. For example, stereo high definition pulse-code modulation (PCM) audio at 96 KHz sampling rate and 32 bit sampling depth requires more than 6 megabits per second (Mbps). Multi-channel audio or higher sampling rates require even more data.

Wireless transmission via low power or short range protocols may be limited in bandwidth—Bluetooth has a maximum data rate of 3 Mbps at present and is therefore unable to carry stereo high definition audio. High bandwidth transmission systems such as the various 802.11 (WiFi) protocols provide enough bandwidth, but have higher overhead requirements, require more power (e.g. WiFi may require up to 350 milliwatts of power or more, and thus be unsuitable for applications with very low battery capacities such as wireless earbuds), may have higher latency (e.g. due to slow start or congestion avoidance protocols, etc.), and/or may have difficulty changing frequencies due to intermittent interference in the same band.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1A is a block diagram depicting an embodiment of a network environment for low power wireless media transport;

FIG. 1B is a block diagram depicting an embodiment of a network environment for low power high definition wireless media transport, according to the systems and methods disclosed herein;

FIG. 3A is a block diagram depicting an embodiment of a network environment including one or more access points in communication with one or more devices or stations.

Figure 1C:
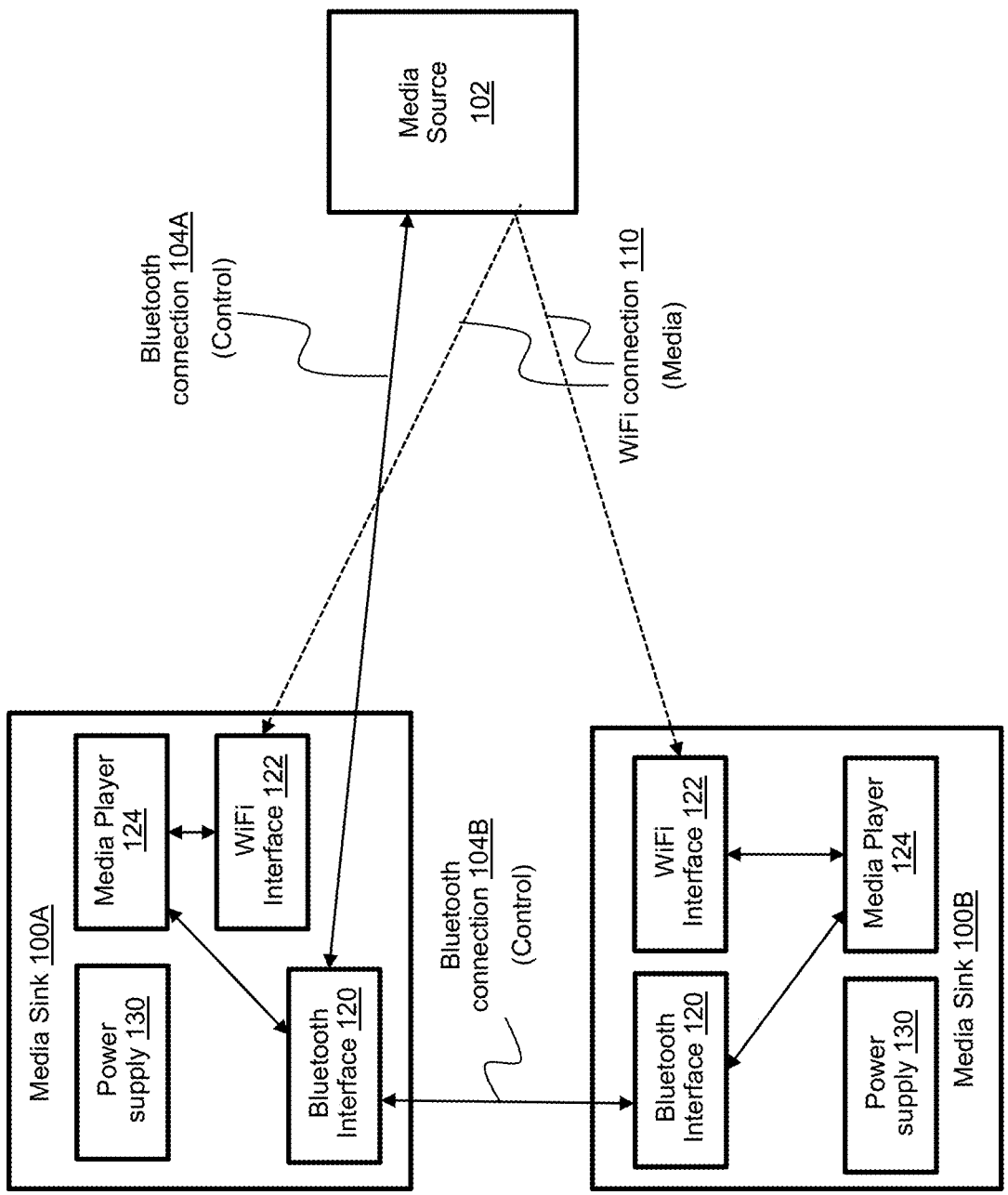
FIG. 1C is a block diagram depicting details of embodiments of elements of the environment of FIG. 1B.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure may reference aspects of these standard(s), the disclosure is in no way limited by these standard(s).

For purposes of reading the description of the various embodiments below, the following descriptions of the sections of the specification and their respective contents may be helpful:

- Section A describes embodiments of systems and methods for a low power high definition wireless media transport and
- Section B describes a network environment and computing environment which may be useful for practicing embodiments described herein.

A. Low Power High Definition Wireless Media Transport

Transmitting media data wirelessly is desirable in many instances, such as transmitting audio to wireless speakers, headsets, and/or earbuds, or from wireless microphones; transmitting video data to wireless displays; or transmitting multimedia to media devices. However, such media may require significant amounts of bandwidth for transmission. For example, stereo high definition pulse-code modulation (PCM) audio at 96 KHz sampling rate and 32 bit sampling depth requires more than 6 megabits per second (Mbps). Multi-channel audio or higher sampling rates require even more data: a 192 KHz sampled, 32-bit, 5 channel audio file requires more than 30.7 Mbps for transmission.

For example, referring briefly to FIG. 1A, illustrated is a block diagram depicting an embodiment of a network environment for low power wireless media transport. The environment includes a media sink 100, sometimes referred to as a client, receiver, or media device, which may comprise wireless speakers, earbuds, headphones, headsets, monitors or displays or other such devices for receiving a media signal. The environment also includes a media source 102, sometimes referred to as a host, transmitter, or media device, which may comprise a desktop computer, laptop computer, smart phone, set top box, A/V receiver, video game console, tablet computer, wearable computer, server, workstation, appliance, home automation system, or any other type and form of computing device for transmitting a media signal to a media sink 100. The media source 102 and media sink 100 may communicate, in some implementations, via a low power or short range protocol 104 such as Bluetooth carrying both media and control signals (e.g. synchronization, error or retransmission control, control commands, etc.). In some implementations, the media source 102 may also receive media via a second connection 108 such as a wide area network connection (e.g. the Internet) from a media provider 106 (e.g. a streaming media provider, a social network provider, an Internet broadcaster or other such source, etc.). In such implementations, the media source 102 may transcode and/or retransmit the received media to the media sink 100.

Wireless transmission via low power or short range protocols may be limited in bandwidth—Bluetooth has a maximum data rate of 3 Mbps at present and is therefore unable to carry stereo high definition audio. Accordingly, in many implementations, media source 102 may transcode media to lower bit rates or compress the media (e.g. via a lossy encoding scheme) to reduce the required bandwidth, albeit reducing quality and/or adding latency.

High bandwidth transmission systems such as the various 802.11 (WiFi) protocols may provide enough bandwidth for high definition media and may be used in place of connection 104, but have higher overhead requirements, require more power (e.g. WiFi may require up to 350 milliwatts of power or more, and thus be unsuitable for applications with very low battery capacities such as wireless earbuds), may have higher latency (e.g. due to slow start or congestion avoidance protocols, etc.), and/or may have difficulty changing frequencies due to intermittent interference in the same band.

The systems and methods discussed herein provide a low power high definition media transport protocol, by splitting media and control signals across disparate and heterogeneous connections. FIG. 1B is a block diagram depicting an embodiment of a network environment providing such a low power high definition wireless media transport, splitting control signals to a first connection 104', and providing media via a high bandwidth connection 110, such as an) 802.11 (WiFi) connection. Various implementations of high bandwidth connections 110 may be used, such as 802.11a, 802.11b, 802.11g, 802.11n, 802.11ac, 802.11ax, or any other version, as well as other types and forms of high bandwidth connections such as Wireless USB; optical; or any other type and form of connection. Similarly, various implementations of low power connections 104' may be used, such as Bluetooth Low Energy (BTLE), Bluetooth Basic Rate (BR), Bluetooth Enhanced Data Rate (EDR), Bluetooth Low Energy-Enhanced Data Rate (ELE), near-field communications (NFC), or any other type and form of power-efficient communication protocol. Multi-channel media data may be streamed via the high bandwidth connection 110, including interleaved stereo audio for wireless earbuds or other such data. Control signals may be transmitted between the media source and sink via the low power connection 104', including acknowledgements (ACKs) or negative acknowledgements (NAKs) for data transmitted via the high bandwidth connection, thus not requiring return transmissions via the high bandwidth connection path 110 and further reducing power requirements for the media sink 100.

In a similar implementation depicted in FIG. 1C, two media sinks 100A-100B such as two wireless earbuds may communicate control signals between themselves via a first low power connection (e.g. Bluetooth connection 104B) via a low power interface 120 of each device. The low power interface 120 may comprise a physical and/or link layer network interface, such as a Bluetooth modem, amplifier, antenna, and/or other associated hardware and/or software. In some implementations, one media sink 100A may communicate control signals to a media source 102 via a second low power connection (e.g. Bluetooth connection 104A) as shown. In such implementations, media sink 100A may be referred to as primary or master, and media sink 100B may be referred to as secondary or slave, or by any other equivalent terms. The secondary media sink 100B may transmit control commands or status information to the primary media sink 100A, which may aggregate the control or status information with its own control or status commands, and/or forward the control or status information to the media source 102. This may sometimes be referred to as "shadowing"—i.e. the secondary sink "shadows" the primary sink, and the media source 102 is only aware of or connected to the primary sink. In other implementations, each media sink 100A-100B may establish a separate low power connection 104 to the media source 102 and transmit its own control and status information. Although only two media sinks are illustrated, in many implementations, additional media sinks may be included, either with independent low power connections to the media source or all communicating to a single primary or master media sink for command aggregation.

Each media sink 100 may also comprise a high bandwidth interface 122, such as a WiFi interface, which may comprise a physical and/or link layer network interface, such as an 802.11 modem, amplifier, antenna, and/or other associated hardware and/or software. In some implementations, low power interface 120 and high bandwidth interface 122 may share some hardware, such as antennas or amplifiers. Each media sink 100 may receive broadcast media data via high bandwidth connection 110. The high bandwidth connection may comprise an 802.11 connection, as discussed above, such as 802.11n or 802.11ac. In some implementations, the connection may comprise an Internet Protocol (IP)/User Datagram Protocol (UDP) multicast or broadcast, or similar lossy transport protocol. In other implementations, the connection may comprise any type and form of unidirectional protocol, such that the media source 102 may transmit media data (such as interleaved multi-channel audio data) without expecting a reply or response via the high bandwidth connection. By moving control and command data to low power connections 104 from high bandwidth connection 110, each media sink 100 may reduce power consumption. In some implementations, media sinks 100 may lack some hardware for data transmission via high bandwidth connection 110 (e.g. amplifiers), reducing manufacturing costs.

Each media sink 100 may comprise a media player 124. Media player 124 may comprise hardware, such as a digital to analog (DAC) converter, amplifier, output device (e.g. aural and/or visual transducer), and/or other such devices for receiving media data via a high bandwidth connection 110 (e.g. WiFi, cellular data, etc.), buffering and/or decoding the data, and outputting the media. In some implementations, media player 124 may comprise data buffers, such as ring buffers or first-in/first-out (FIFO) buffers for accumulating data packets or segments from media source 102 for decoding. Media player 124 may also comprise hardware or software decoders, such as MPEG audio or video decoders, decompression hardware or software, or other such components. Media player 124 may also comprise control software for monitoring receipt of data and generating ACKs or NAKs to be transmitted via low power connection(s) 104 to a media source, as well as generating control commands (e.g. play, pause, stop, next, previous, etc.) and/or synchronization signals for transmission to a media source. In some implementations, media player 124 may also control functionality of the media sink 100, such as volume controls.

Each media sink 100 may comprise a power supply 130, such as a battery, charger, or other such hardware and, in some implementations, software (e.g. for intelligent charging systems). Power supply 130 may comprise a wired or wireless power input, removable or non-removable battery, or any other type and form of supply.

In some implementations, the media source 102 may comprise a high bandwidth interface (such as a WiFi interface 122), and may perform self-channel classification and/or selection to choose broadcasting channels that are free from interference (e.g. a self channel classification mechanism to select a 20 MHz channel within the 5 GHz ISM band). The media source 102 may inform the media sink(s) which channel will be used via the low power connection 104. Channel selection may be dynamic and may change during streaming of media data.

Figure 2A:
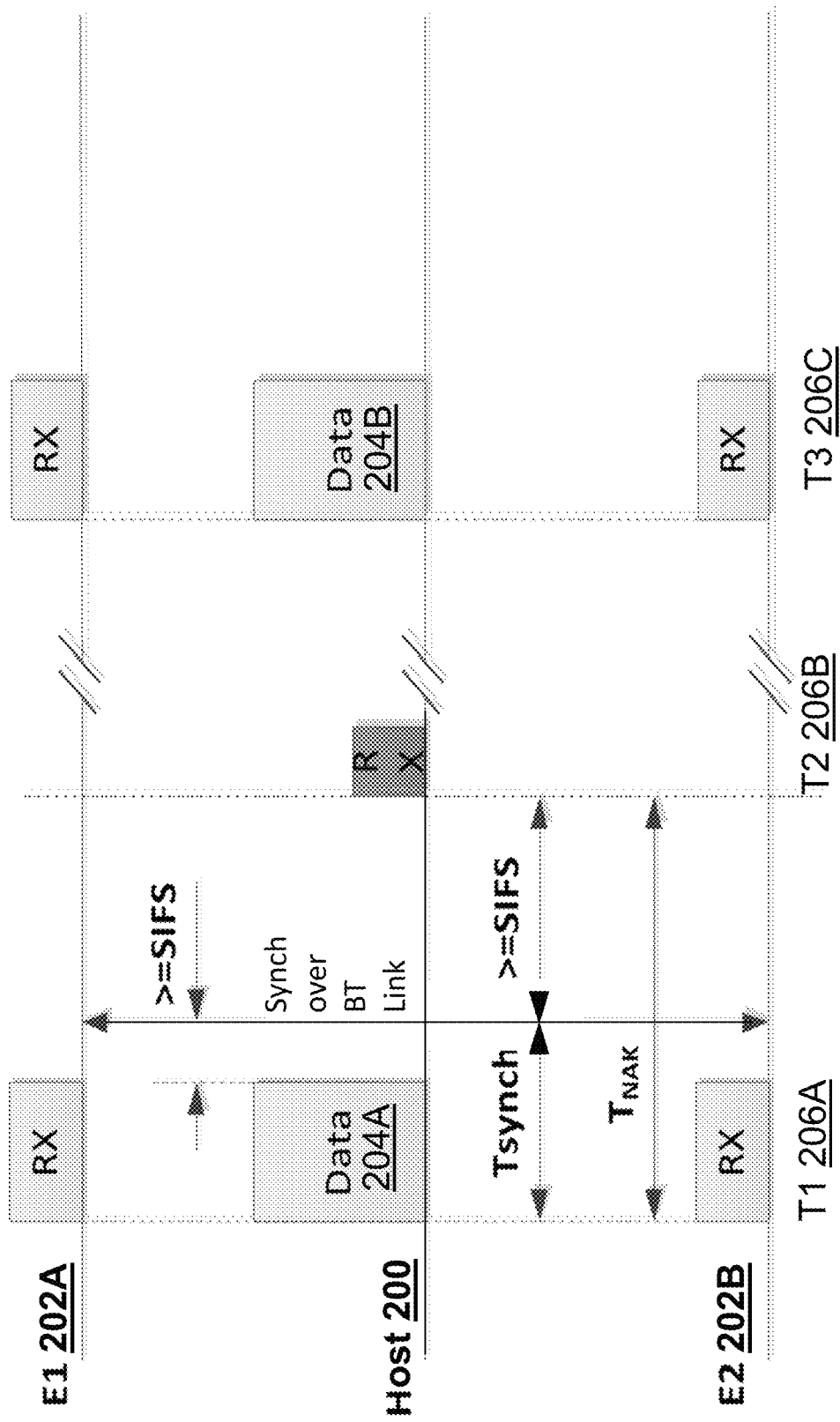
FIGS. 2A-2F are illustrations depicting different embodiments and states of a low power high definition wireless media transport.

In some implementations, Bluetooth and/or WiFi interfaces on the media sinks and/or source may be disabled or transmitters shut down during predetermined periods. For example, FIG. 2A is an illustration depicting an embodiment of media transmission for a low power high definition wireless media transport from a host 200 or media source to two media sinks (e.g. left and right earbuds 202A-202B). Once connections have been established, the host or source 200 may transmit a first block of data 204A via a high bandwidth interface at a first time period T1 206A. The first block of data 204A may comprise multichannel or stereo interleaved or concatenated data for sinks 202A-202B. In some implementations, after transmission, the host 200 may shut down a high bandwidth transmitter. Data transmission may be performed within a time period $T_{synch}$. Upon expiration of the $T_{synch}$ period, the media sinks may communicate control or status commands via the low power connection (e.g. from a secondary sink to a primary sink). To avoid interference between data 204A and the control or status commands, $T_{synch}$ may be equal to or greater than the data transmission period (e.g. time to transmit data 204A) plus an interframe spacing period (SIFS). The exchanged status command may include, in some implementations, an indication that each sink received and/or decoded its portion of data 204A correctly.

At a predetermined second time T2 206B, host 200 may enable a receiver or listen via the low bandwidth connection for status or control commands from the primary media sink 202 (and or other media sinks, in some implementations). T2 may be at the expiration of $T_{NAK}$, or a time at which a negative acknowledgement for any missed data 204 is expected. If data is received correctly, then in some implementations, the sinks may not notify the host 200 or transmit a NAK as shown. If no NAK is received at time T2 206B, then the host may flush the current packet or data block 204A from a transmission buffer. At a subsequent time period T3 206C, the host 200 may transmit a second block of media data 204B via the high bandwidth connection. $T_{NAK}$ may comprise $T_{synch}$ plus a time period greater than or equal to a SIFS period. Data transmission intervals, high bandwidth modulation and coding schemes (MCS), and other parameters may be selected dynamically based on the media bandwidth required, lipsynch or latency requirements (e.g. for simultaneous display of audio and video or low latency implementations such as for voice or video conferencing), and/or noise or interference levels. Although discussed in terms of NAKs, in some implementations, sink(s) 202 may transmit explicit ACKs to the host 200, albeit at the expense of battery usage or power efficiency.

Figure 2B:
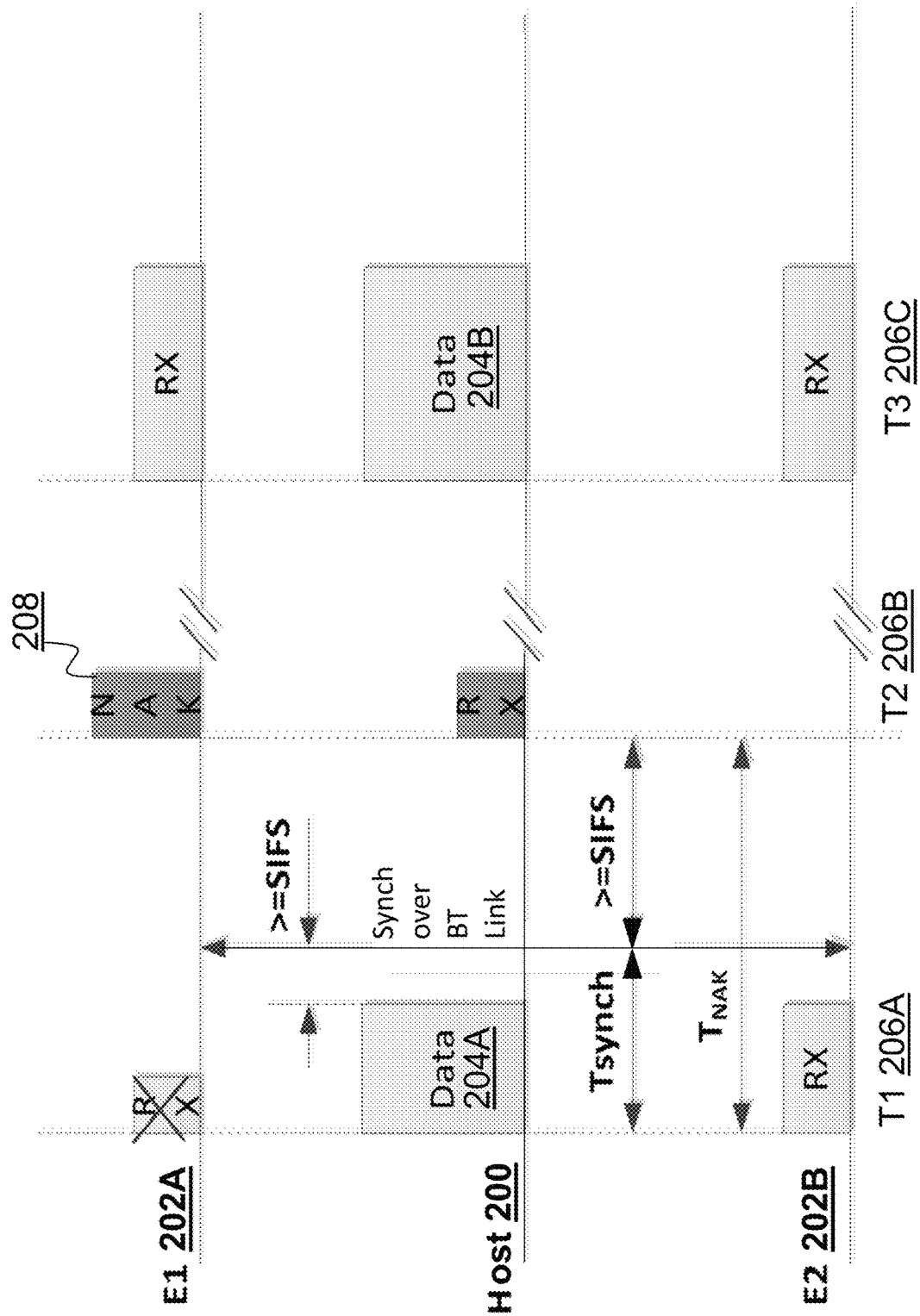

In the implementation shown in FIG. 2A, data is received successfully, and accordingly, no NAK is transmitted at T2 206B. In the implementation illustrated in FIG. 2B, sink 202A fails to successfully receive data 204A (e.g. due to noise or other interference, due to coding or decoding errors, or any other such reception problem). At $T_{synch}$, sink 202B may indicate to sink 202A that it received the data successfully. At T2 206B, in some implementations, sink 202A may generate and transmit a NAK via the low power connection indicating that it did not receive its portion of data 204A. In response, in some implementations, host 200 may combine the media data from data 204A (or a portion of the data, such as a portion corresponding to sink 202A) with subsequent data 204B and transmit both sets of data at T3 206C. Sink 202A may receive and play both segments 204A-204B in order. In some implementations in which all of data 204A is resent, sink 202B may discard the retransmitted data on receipt, having already properly received its portion of the data at T1 206A. Such implementations do not require the NAK to distinguish between sinks, and accordingly, the NAK may be smaller and consume less battery from the master sink (e.g. the NAK may be a one-bit flag in such implementations indicating successful or unsuccessful receipt). In other implementations, the NAK may be a multibit flag with values corresponding to each channel to be retransmitted (e.g. two bits for two channels, three bits for three channels, five bits for five channels, etc., such that the NAK may identify any combination of channels for retransmission, such as 01001 for channels 2 and 5).

Figure 2C:
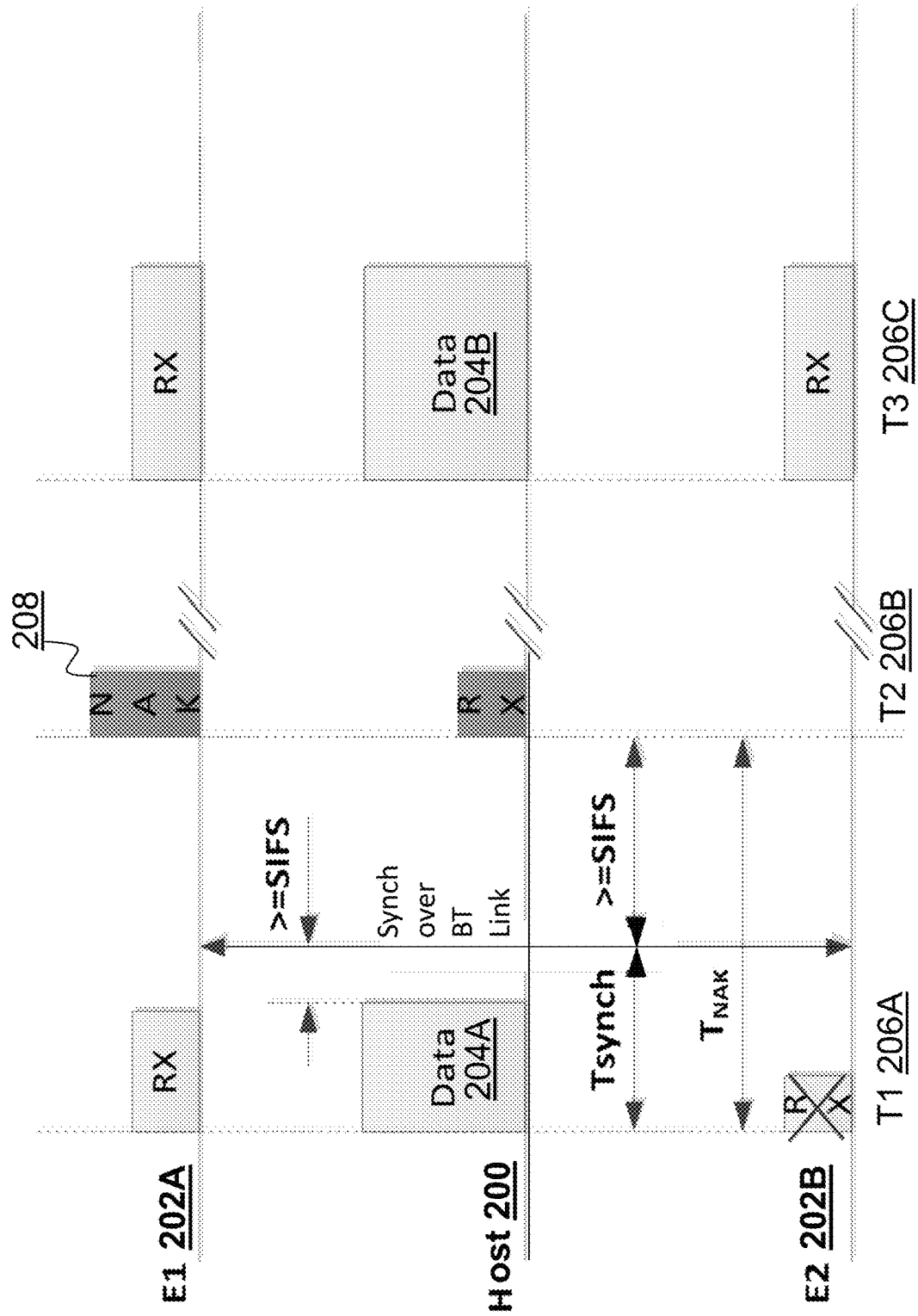

In a similar implementation illustrated in FIG. 2C, sink 202A successfully receives the data, but sink 202B does not. In implementations in which sink 202A is a primary sink, at synchronization time $T_{synch}$, secondary sink 202B may transmit a NAK to sink 202A, which may transmit the NAK to host 200 at time T2 206B via the low power connection as discussed above in connection with FIG. 2B. Also as discussed above, host 200 may retransmit data 204A or a portion of data 204A with data 204B at time T3 206C via the high bandwidth connection.

Figure 2D:
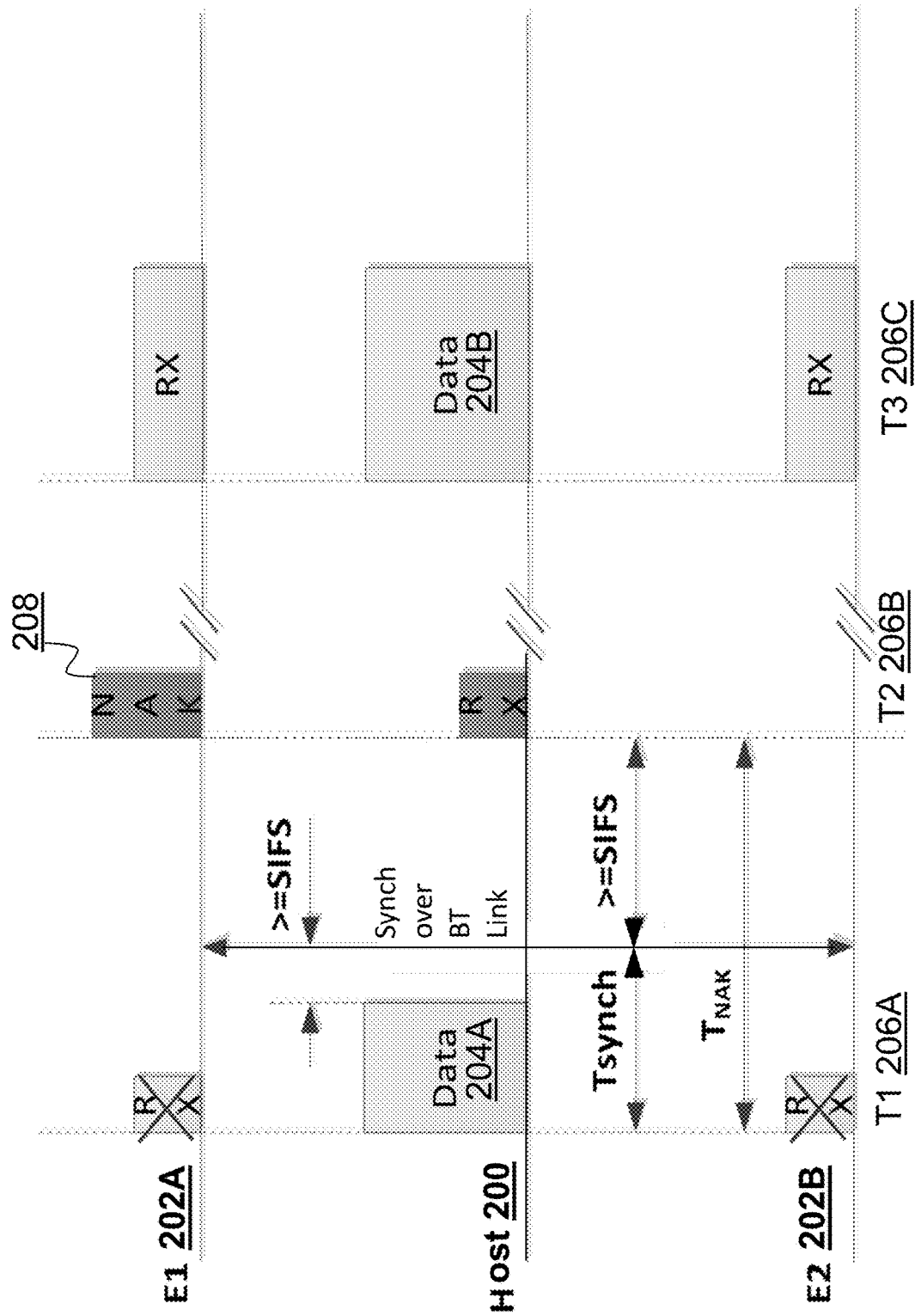

In another similar implementation illustrated in FIG. 2D, neither sink 202A-202B receives the data successfully. In implementations in which sink 202A is a primary sink, at synchronization time $T_{synch}$, secondary sink 202B may transmit a NAK to sink 202A. Sink 202A may aggregate the NAK with its own NAK (e.g. in multichannel or multi-bit NAK implementations, as discussed above) and/or may transmit its own NAK to host 200 at time T2 206B via the low power connection as discussed above in connection with FIG. 2B. Also as discussed above, host 200 may retransmit data 204A or a portion of data 204A with data 204B at time T3 206C via the high bandwidth connection.

Figure 2E:
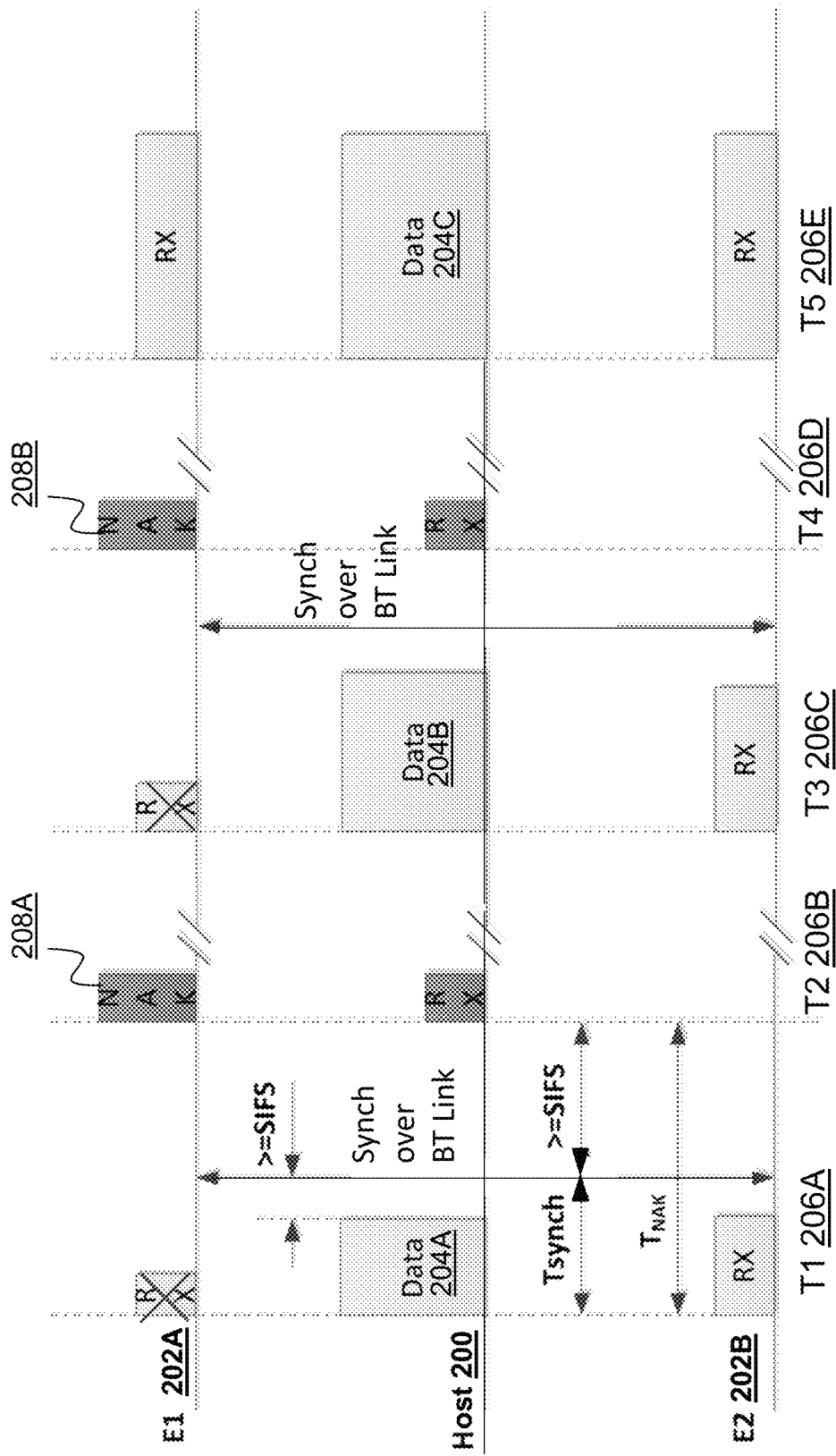

FIG. 2E is another illustration depicting an implementation in which consecutive packets are not received successfully by a sink, such as sink 202A. The transmission of data 204A and 204B and first NAK 208A at time T2 206B is performed similar to those discussed above in connection with FIG. 2B. At T3 206C, sink 202A fails to receive the second data 204B (and possibly the retransmission of data 204A). At T4 206D, sink 202A may transmit a second NAK 208B via the low power connection. In some implementations, the host 200 may aggregate data 204A, 204B, and new data 204C and transmit them together at T5 206E, retransmitting both data 204A-204B and allowing the sink 202A to buffer and play the media properly. In some implementations, this process may be iterated as many times as necessary with additional data aggregated into the transmitted packet, until the packet length exceeds a receive buffer of the sink and/or a transmission time for the packet exceeds $T_{synch}$.

Figure 2F:
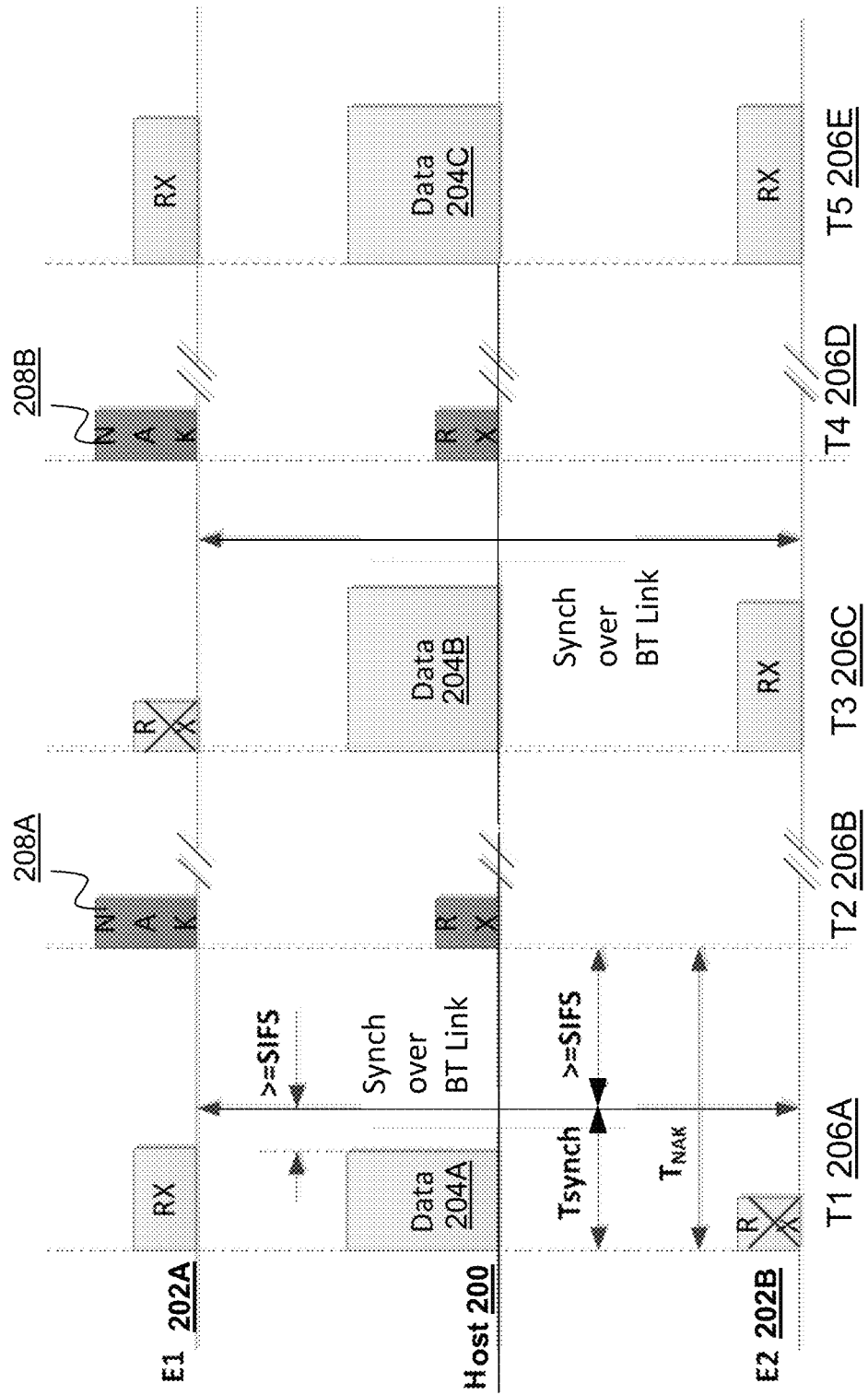

FIG. 2F is another illustration depicting a similar implementation to FIG. 2E, in which packets are missed alternately by sink 202B and 202A as shown. In one implementation, transmissions may be similar to those depicted in FIG. 2E: the master sink 202A may transmit a first NAK 208A at time T2 206B; and may transmit a second NAK 208B at time T4 206D; and the host 200 may aggregate data 204A, 204B, and 204C for transmission at T5 206E. However, it may be noted that in the illustrated example, sink 202A received data 204A at time T1 and sink 202B received data 204A at time T3 as part of the retransmission; accordingly, data 204A need not be retransmitted. Thus, in some implementations, a NAK 208 may identify which data was not received or distinguish between the most recent data and prior data (sometimes referred to as a selective NAK). NAK 208 may indicate that data 204B was not properly received, and thus, in such implementations, host 200 may aggregated only the second data 204B and data 204C for transmission at T5 206E, avoiding having to retransmit data 204A for a second time. In one such implementation, NAKs may comprise a sequence number or set of sequence numbers of missing packets. In another such implementation, a NAK may comprise a sequence number of a last not-received packet (e.g. such that said packet and any more recent packets may be transmitted). In yet another such implementation, a NAK may comprise a counter of packets or blocks not properly received. This may reduce NAK sizes when packet loss periods are short or intermittent.

Figure 2G:
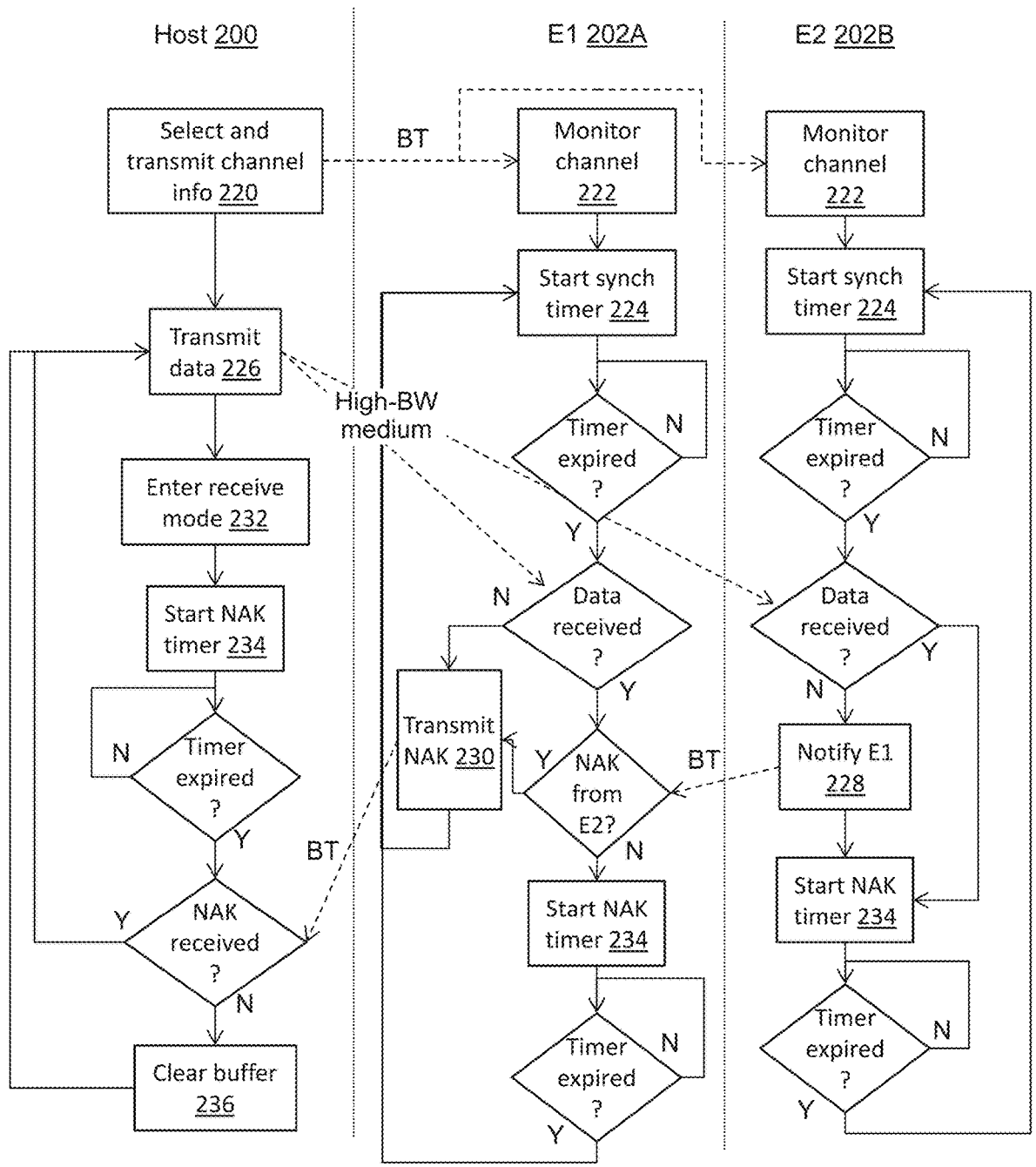
FIG. 2G is a flow chart of an embodiment of a method for low power high definition wireless media transport.

FIG. 2G is a flow chart of an embodiment of a method for low power high definition wireless media transport, illustration actions taken by a media host or source 200 and media clients or sinks 202A-202B, one of which (e.g. sink E1 202A) may serve as a master sink, in charge of synchronization and acknowledgements with the media source 200; and the other of which (e.g. sink E2 202B) may serve as a slave sink. In some implementations, only one media sink may be used (e.g. E2 202B may be absent). In such implementations, the media sink may perform actions of E1 202A.

As discussed above, media sources 200 and clients 202 may communicate control and synchronization information via a first, low energy medium, such as Bluetooth. These devices may establish communications via any corresponding protocol common to the medium (e.g. Bluetooth 'pairing' or other communication establishment algorithms, which may include authentication, establishing encryption parameters, or any other such features).

As discussed above, in some implementations, the host device 200 may select a channel of a second, high data rate medium on which to transmit data. For example, in some implementations, the host device may transmit data to client devices via a 5G cellular connection, and may select a 20 MHz channel on which to transmit data. In other implementations, other high-bandwidth mediums may be used, such as an 802.11 transmission medium (e.g. 802.11n WiFi). This selection process, performed at step 220, may include listening to or measuring noise or other interference on various channels and selecting a channel with appropriate characteristics (e.g. low noise or interference, high signal strength, appropriate spacing from other channels being utilized, etc.). The media host may transmit channel selection information and/or other configuration or synchronization information to client devices 202 at step 220. This synchronization information may include timing information so that devices 200, 202 may coordinate transmission and reception time periods, as discussed above.

At step 222, client devices 202 may begin monitoring the selected or identified high-bandwidth channel, in response to receipt of configuration information transmitted at step 220. Although shown transmitted from host 200 to devices 202A, 202B, in some implementations, a master device 202A may receive the configuration or selection information and forward the information to slave device 202B via the low energy medium (e.g. Bluetooth).

At step 224, client devices 202 may start local synchronization timers, sometimes referred to as data reception timers, receive timers, expected data timers, or by other similar terms. The timers may indicate a period during which data is expected (e.g. $T_{synch}$ as discussed above), and may include one or more SIFS periods. In some implementations, client devices 202 may start a plurality of timers, such as a first timer to indicate a time at which synchronization between client devices is to occur (e.g. when a slave device should transmit a negative acknowledgement, if appropriate, to the master device), and a second timer to indicate a time at which NAK transmission is to occur. In many implementations, client devices may maintain different timers. For example, a slave device may maintain a first timer indicating the start of a data reception period and a second timer indicating when it is to transmit synchronization information to a master device, but may not necessarily maintain a third timer indicating when NAK transmission to the host device is to occur, as such transmissions are to be made by the master device. In other implementations, for ease of configuration and programming, each device may maintain the same timers.

At step 226, the host device may transmit data via the high-bandwidth medium to the client devices. The transmission may include separate data for each device (e.g. concatenated or interleaved, depending on implementation). The data may be of any type and format, such as a segment of stereo encoded audio data, or any other such data.

As discussed above, the transmitted data may or may not be received by client devices 202A, 202B. Each device may wait for the transmitted data until the end of a listening period (e.g. $T_{synch}$) while monitoring the selected channel or listening to the high-bandwidth medium. The client device may perform required steps such as filtering broadcast carriers, decoding sideband data, performing error checking algorithms, or other such features required to receive data on the medium.

Upon expiration of the receive timer, the client devices may determine if the data has been properly received. Referring first to a slave device 202B, if data has not been properly received (e.g. no data detected, or corrupt data is received), then at step 228, the slave device may notify the master device that it has not successfully received data (e.g. via a NAK transmission) via the low energy transmission medium (e.g. Bluetooth). Conversely, if data has been successfully received and decoded, then slave device 202B may, in some implementations, initiate a NAK timer at step 234. The NAK timer, sometimes referred to as a transmission timer, may measure a time period during which a NAK transmission 208 may occur (plus, in some implementations, a SIFS period); or conversely, a time period until a next data transmission is to occur (e.g. T3 206C). The slave device may wait until expiration of this timer, and then reset $T_{synch}$ and return to step 224. In other implementations, the slave device may not maintain a NAK timer, and instead may maintain a single, longer timer with a duration equal to both a data reception period and a NAK period such that expiration of this timer indicates that further data is to be expected. In many implementations, step 228 may occur regardless of whether data is received or not; in such implementations, the slave device may notify the master device via the low energy medium whether it has or has not successfully received data. This may be useful in implementations in which other data may need to be exchanged between the client devices (e.g. local synchronization information for playback, such as playback time stamps). Although not illustrated, in many implementations, the slave device may buffer and/or decode and playback the received media data.

Referring next to master client device 202A, similar to slave device 202B, the device may monitor the selected high bandwidth channel for data. If data is not successfully received before expiration of the synchronization timer, then at step 230, the master device may transmit a negative acknowledgement to the host device via the low energy medium (e.g. Bluetooth). The negative acknowledgement may comprise a synchronization or segment number or other data to indicate which segment was not properly received; or in some implementations, may indicate the last segment that was properly received.

As shown, the master device may transmit the NAK at step 230 if it did not successfully receive data. Similarly, as discussed above, in some implementations, even if the master device received the data successfully, if the master device receives a negative acknowledgement from the slave device (e.g. transmitted at step 228), then the master device may also transmit the NAK at step 230. In some implementations, the NAK transmitted at step 230 may not indicate which client device failed to receive data, and all of the data may be retransmitted. In other implementations, the NAK may indicate which client device (e.g. master, slave, or both; or potentially which of multiple slave devices in multi-channel implementations) failed to receive data, such that only the unreceived data may be retransmitted. Unsuccessful reception may be indicated for each device via flags or a predetermined string (e.g. 0 for channel 1 or master device, 1 for channel 2 or slave device, etc.). Transmitting the NAK may comprise starting a NAK timer at step 234 in some implementations. Additionally, as discussed above, in some implementations in which data is received successfully by the client devices, the master device may start a NAK timer at step 234. Upon expiration of the timer, the device may reset the synchronization timer at step 224 and continue monitoring the channel for more data. Although not illustrated, the master device may also buffer, decode, and/or playback received media data.

Returning to the host device 200, after transmitting data at step 226, the device may enter receive mode at step 232 or monitor the low energy medium (e.g. Bluetooth) for a NAK transmission from a client device. The host device may, in some implementations, initiate a NAK timer at step 234, or wait for a predetermined time period to receive a NAK from the client devices via the low energy medium.

Upon expiration of the timer, if no NAK has been received, then the host device may proceed with the next data transmission at step 226. In some implementations, the host device may discard a previously transmitted data segment from a transmission or retransmission buffer at step 236. In some implementations, the host may also periodically repeat step 220, in case noise levels on the channel have increased.

If a NAK has been received, then the unacknowledged data segment (or segments) may retransmitted at step 226. In some implementations, the unacknowledged data segment may be added to new data (e.g. concatenated with new data) for transmission, so as to continue transmitting new data and maintaining temporal synchronization. This may proceed with necessary retransmissions until reaching a data frame size limit, at which point either older data may be dropped or a retransmission without new data added may occur, depending on implementation. Additionally, as discussed above, in some implementations, unacknowledged data for different channels may be aggregated and retransmitted. For example, as discussed above in connection with FIG. 2F, a first segment of data unacknowledged by one client device and a second segment of data unacknowledged by a second client device may be aggregated and transmitted with a third segment of data, even where the first segment and second segment are not from the same original transmission.

Accordingly, the systems and methods discussed herein provide for a hybrid low power, high bandwidth media transport protocol between media sinks and media sources by splitting control and synchronization commands to a low power communication interface, and media data to a high bandwidth unidirectional communication interface. Media sinks need not transmit via the high bandwidth unidirectional communication interface, reducing power consumption, which may be particularly beneficial for small devices with limited battery capacity such as wireless earbuds. In some implementations, the media sinks may stay silent during NAK periods if data is received correctly, further reducing power consumption.

In one aspect, the present disclosure is directed to a system for low power, high bandwidth media transport. The system includes a media sink comprising a first communication interface in communication with a media source via a first low power wireless communication medium, and a second communication interface in communication with the media source via a second high bandwidth wireless communication medium. The first communication interface is configured to transmit synchronization information to the media source via the low power wireless communication medium. The second communication interface is configured to receive media data from the media source via the high bandwidth wireless communication medium.

In some implementations, the first communication interface is further configured to transmit a negative acknowledgement of a media segment via the low power wireless communication medium to the media source, responsive to the second communication interface not successfully receiving the media segment via the high bandwidth wireless communication medium from the media source during a predetermined time period. In a further implementation, the media sink further comprises a timer corresponding to the predetermined time period.

In some implementations, the first communication interface is in communication with a second media sink via the low power wireless communication medium. In a further implementation, the first communication interface is further configured to receive a negative acknowledgement of a media segment via the low power wireless communication medium from the second media sink. In a still further implementation, the first communication interface is further configured to transmit a negative acknowledgement of the media segment to the media source via the low power wireless communication medium, responsive to receipt of the negative acknowledgement of the media segment from the second media sink. In another still further implementation, the first communication interface is further configured to transmit a negative acknowledgement of a second media segment to the media source via the low power wireless communication medium, responsive to the second communication interface not successfully receiving the media segment via the high bandwidth wireless communication medium from the media source during the predetermined time period.

In another aspect, the present disclosure is directed to a system for low power, high bandwidth media transport. The system includes a media source comprising a first communication interface in communication with at least one media sink via a first low power wireless communication medium, and a second communication interface in communication with the at least one media sink via a second high bandwidth wireless communication medium. The first communication interface is configured to receive synchronization information from the at least one media sink via the low power wireless communication medium. The second communication interface is configured to transmit media data to the at least one media sink via the high bandwidth wireless communication medium.

In some implementations, the first communication interface is further configured to receive a negative acknowledgement of a media segment via the low power wireless communication medium from a first media sink, responsive to either the first media sink or a second media sink of the at least one media sinks not successfully receiving the media segment via the high bandwidth wireless communication medium from the media source during a predetermined time period. In a further implementation, the first communication interface is further configured to retransmit the media segment, responsive to receipt of the negative acknowledgement.

In some implementations, the media source is further configured to select a channel from a plurality of channels of the high bandwidth wireless communication medium. In a further implementation, the first communication interface is further configured to transmit an identification of the selected channel to the at least one media sink via the low power wireless communication medium.

In some implementations, the media source further comprises a negative acknowledgement timer initiated responsive to transmission of a media segment by the second communication interface, the media segment held in a buffer of the second communication interface. In a further implementation, the second communication interface is further configured to remove the media segment from the buffer of the second communication interface, responsive to not receiving a negative acknowledgement for the media segment via the first communication interface prior to expiration of the negative acknowledgement timer.

In another aspect, the present disclosure is directed to a method for low power, high bandwidth media transport. The method includes initiating a reception timer, by a media sink. The method also includes monitoring, by a first communication interface of the media sink, a high bandwidth wireless communication medium for a media segment transmitted by a media source. The method also includes, upon expiration of the reception timer, determining, by the media sink, that the media segment has not been successfully received by the first communication interface. The method also includes, responsive to not successfully receiving the media segment, transmitting, by a second communication interface of the media sink different from the first communication interface, via a low power wireless communication medium to the media source, a negative acknowledgement for the media segment.

In some implementations, the method includes, after transmitting the negative acknowledgement for the media segment: resetting the reception timer, by the media sink; monitoring, by the first communication interface, the high bandwidth wireless communication medium for a retransmission of the media segment from the media source; and receiving, by the first communication interface, the retransmitted media segment. In a further implementation, the method includes receiving, by the second communication interface from a second media sink, a second negative acknowledgement for the media segment, transmitted by the second media sink responsive to not successfully receiving the retransmitted media segment. In a still further implementation, the method includes, responsive to receipt of the second negative acknowledgement from the second media sink, transmitting, by the second communication interface to the media source, a third negative acknowledgement for the media segment.

In some implementations, the method includes receiving a subsequent media segment with the retransmitted media segment via the first communication interface. In some implementations, the method includes providing the retransmitted media segment via an output of the media sink.

B. Computing and Network Environment

Figure 3B:
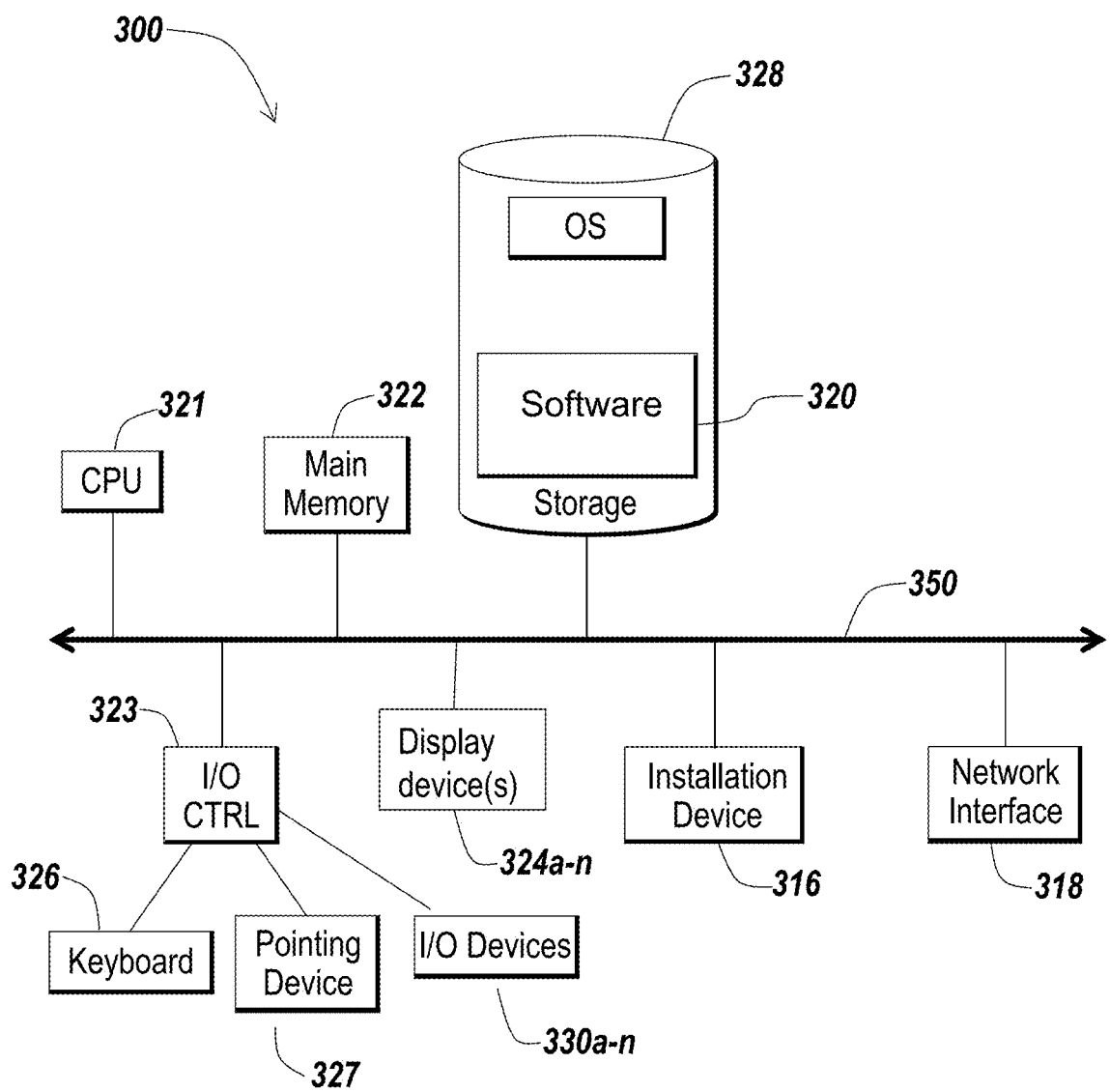
FIGS. 3B and 3C are block diagrams depicting embodiments of computing devices useful in connection with the methods and systems described herein.

Having discussed specific embodiments of the present solution, it may be helpful to describe aspects of the operating environment as well as associated system components (e.g., hardware elements) in connection with the methods and systems described herein. Referring to FIG. 3A, an embodiment of a network environment is depicted. In brief overview, the network environment includes a wireless communication system that includes one or more access points 306, one or more wireless communication devices 302 and a network hardware component 392. The wireless communication devices 302 may for example include laptop computers 302, tablets 302, personal computers 302 and/or cellular telephone devices 302. The details of an embodiment of each wireless communication device and/or access point are described in greater detail with reference to FIGS. 3B and 3C. The network environment can be an ad hoc network environment, an infrastructure wireless network environment, a subnet environment, etc. in one embodiment The access points (APs) 306 may be operably coupled to the network hardware 392 via local area network connections. The network hardware 392, which may include a router, gateway, switch, bridge, modem, system controller, appliance, etc., may provide a local area network connection for the communication system. Each of the access points 306 may have an associated antenna or an antenna array to communicate with the wireless communication devices 302 in its area. The wireless communication devices 302 may register with a particular access point 306 to receive services from the communication system (e.g., via a SU-MIMO or MU-MIMO configuration). For direct connections (e.g., point-to-point communications), some wireless communication devices 302 may communicate directly via an allocated channel and communications protocol. Some of the wireless communication devices 302 may be mobile or relatively static with respect to the access point 306.

In some embodiments an access point 306 includes a device or module (including a combination of hardware and software) that allows wireless communication devices 302 to connect to a wired network using Wi-Fi, or other standards. An access point 306 may sometimes be referred to as an wireless access point (WAP). An access point 306 may be configured, designed and/or built for operating in a wireless local area network (WLAN). An access point 306 may connect to a router (e.g., via a wired network) as a stand-alone device in some embodiments. In other embodiments, an access point can be a component of a router. An access point 306 can provide multiple devices 302 access to a network. An access point 306 may, for example, connect to a wired Ethernet connection and provide wireless connections using radio frequency links for other devices 302 to utilize that wired connection. An access point 306 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 306 may be used for (e.g., in-home or in-building) wireless networks (e.g., IEEE 802.11, Bluetooth, ZigBee, any other type of radio frequency based network protocol and/or variations thereof). Each of the wireless communication devices 302 may include a built-in radio and/or is coupled to a radio. Such wireless communication devices 302 and/or access points 306 may operate in accordance with the various aspects of the disclosure as presented herein to enhance performance, reduce costs and/or size, and/or enhance broadband applications. Each wireless communication devices 302 may have the capacity to function as a client node seeking access to resources (e.g., data, and connection to networked nodes such as servers) via one or more access points 306.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 3C:
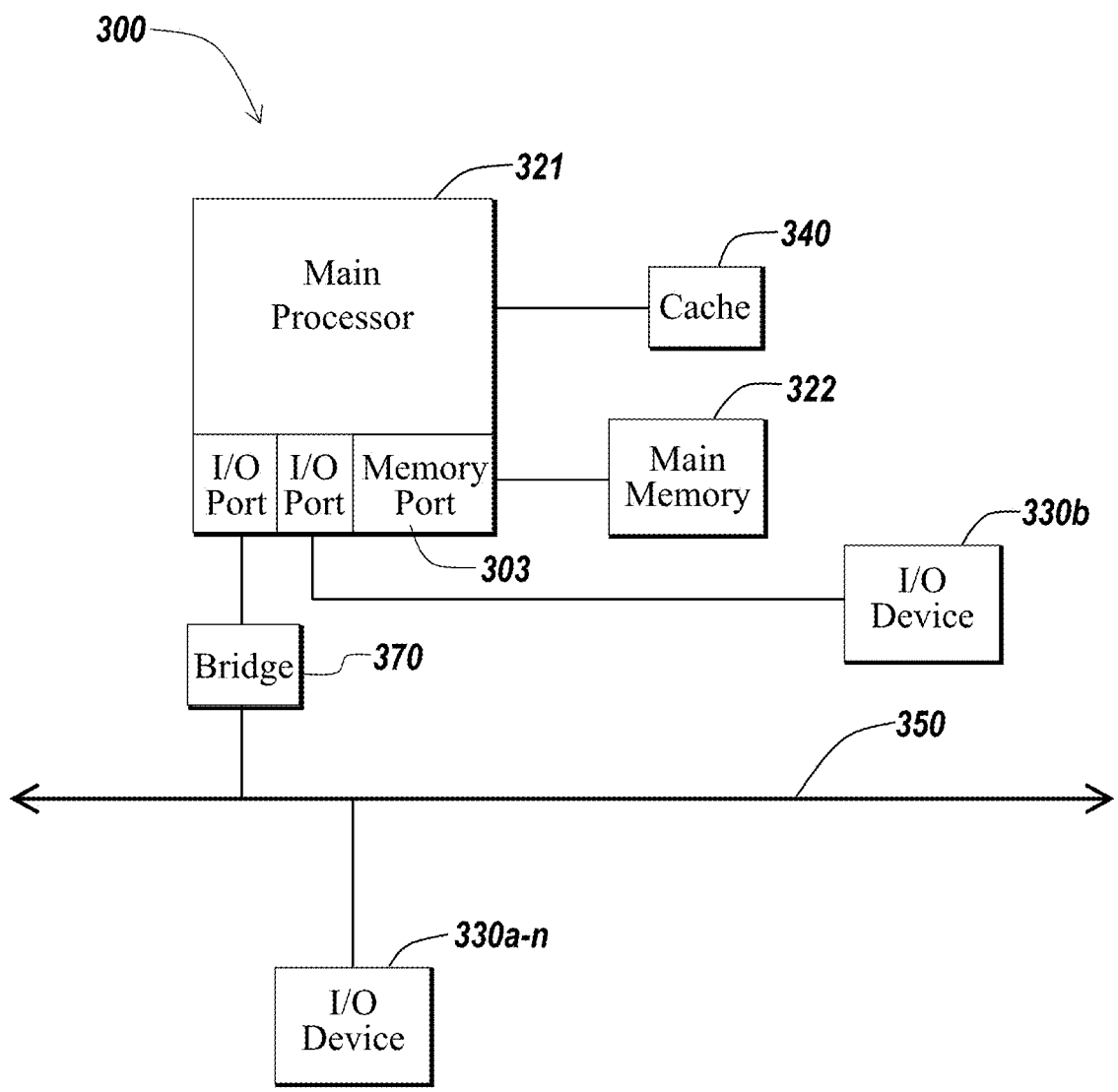

The communications device(s) 302 and access point(s) 306 may be deployed as and/or executed on any type and form of computing device, such as a computer, network device or appliance capable of communicating on any type and form of network and performing the operations described herein. FIGS. 3B and 3C depict block diagrams of a computing device 300 useful for practicing an embodiment of the wireless communication devices 302 or the access point 306. As shown in FIGS. 3B and 3C, each computing device 300 includes a central processing unit 321, and a main memory unit 322. As shown in FIG. 3B, a computing device 300 may include a storage device 328, an installation device 316, a network interface 318, an I/O controller 323, display devices 324a-324n, a keyboard 326 and a pointing device 327, such as a mouse. The storage device 328 may include, without limitation, an operating system and/or software. As shown in FIG. 3C, each computing device 300 may also include additional optional elements, such as a memory port 303, a bridge 370, one or more input/output devices 330a-330n (generally referred to using reference numeral 330), and a cache memory 340 in communication with the central processing unit 321.

The central processing unit 321 is any logic circuitry that responds to and processes instructions fetched from the main memory unit 322. In many embodiments, the central processing unit 321 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 300 may be based on any of these processors, or any other processor capable of operating as described herein.

Main memory unit 322 may be one or more memory chips capable of storing data and allowing any storage location to be directly accessed by the microprocessor 321, such as any type or variant of Static random access memory (SRAM), Dynamic random access memory (DRAM), Ferroelectric RAM (FRAM), NAND Flash, NOR Flash and Solid State Drives (SSD). The main memory 322 may be based on any of the above described memory chips, or any other available memory chips capable of operating as described herein. In the embodiment shown in FIG. 3B, the processor 321 communicates with main memory 322 via a system bus 350 (described in more detail below). FIG. 3C depicts an embodiment of a computing device 300 in which the processor communicates directly with main memory 322 via a memory port 303. For example, in FIG. 3C the main memory 322 may be DRDRAM.

FIG. 3C depicts an embodiment in which the main processor 321 communicates directly with cache memory 340 via a secondary bus, sometimes referred to as a backside bus. In other embodiments, the main processor 321 communicates with cache memory 340 using the system bus 350. Cache memory 340 typically has a faster response time than main memory 322 and is provided by, for example, SRAM, BSRAM, or EDRAM. In the embodiment shown in FIG. 3C, the processor 321 communicates with various I/O devices 330 via a local system bus 350. Various buses may be used to connect the central processing unit 321 to any of the I/O devices 330, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 324, the processor 321 may use an Advanced Graphics Port (AGP) to communicate with the display 324. FIG. 3C depicts an embodiment of a computer 300 in which the main processor 321 may communicate directly with I/O device 330b, for example via HYPERTRANSPORT, RAPIDIO, or INFINIBAND communications technology. FIG. 3C also depicts an embodiment in which local busses and direct communication are mixed: the processor 321 communicates with I/O device 330a using a local interconnect bus while communicating with I/O device 330b directly.

A wide variety of I/O devices 330a-330n may be present in the computing device 300. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 323 as shown in FIG. 3B. The I/O controller may control one or more I/O devices such as a keyboard 326 and a pointing device 327, e.g., a mouse or optical pen. Furthermore, an I/O device may also provide storage and/or an installation medium 316 for the computing device 300. In still other embodiments, the computing device 300 may provide USB connections (not shown) to receive handheld USB storage devices such as the USB Flash Drive line of devices manufactured by Twintech Industry, Inc. of Los Alamitos, California.

Referring again to FIG. 3B, the computing device 300 may support any suitable installation device 316, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 300 may further include a storage device, such as one or more hard disk drives or redundant arrays of independent disks, for storing an operating system and other related software, and for storing application software programs such as any program or software 320 for implementing (e.g., configured and/or designed for) the systems and methods described herein. Optionally, any of the installation devices 316 could also be used as the storage device. Additionally, the operating system and the software can be run from a bootable medium.

Furthermore, the computing device 300 may include a network interface 318 to interface to the network 304 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 300 communicates with other computing devices 300' via any type and/or form of gateway or tunneling protocol such as Secure Socket Layer (SSL) or Transport Layer Security (TLS). The network interface 318 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

In some embodiments, the computing device 300 may include or be connected to one or more display devices 324a-324n. As such, any of the I/O devices 330a-330n and/or the I/O controller 323 may include any type and/or form of suitable hardware, software, or combination of hardware and software to support, enable or provide for the connection and use of the display device(s) 324a-324n by the computing device 300. For example, the computing device 300 may include any type and/or form of video adapter, video card, driver, and/or library to interface, communicate, connect or otherwise use the display device(s) 324a-324n. In one embodiment, a video adapter may include multiple connectors to interface to the display device(s) 324a-324n. In other embodiments, the computing device 300 may include multiple video adapters, with each video adapter connected to the display device(s) 324a-324n. In some embodiments, any portion of the operating system of the computing device 300 may be configured for using multiple displays 324a-324n. One ordinarily skilled in the art will recognize and appreciate the various ways and embodiments that a computing device 300 may be configured to have one or more display devices 324a-324n.

In further embodiments, an I/O device 330 may be a bridge between the system bus 350 and an external communication bus, such as a USB bus, an Apple Desktop Bus, an RS-232 serial connection, a SCSI bus, a Fire Wire bus, a Fire Wire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 300 of the sort depicted in FIGS. 3B and 3C may operate under the control of an operating system, which control scheduling of tasks and access to system resources. The computing device 300 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 300 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 300 has sufficient processor power and memory capacity to perform the operations described herein.

In some embodiments, the computing device 300 may have different processors, operating systems, and input devices consistent with the device. For example, in one embodiment, the computing device 300 is a smart phone, mobile device, tablet or personal digital assistant. In still other embodiments, the computing device 300 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 300 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system comprising:
    a first media sink comprising a first communication interface and a second communication interface, the first communication interface in communication with a media source and a second media sink via a first communication medium, the second communication interface in communication with the media source via a second communication medium, the second communication medium having a higher bandwidth than the first communication medium, wherein the first media sink is configured to:
    receive, with the first communication interface via the first communication medium, first synchronization information from the second media sink, the first synchronization information indicative of a first one or more time periods for the media source to transmit a media segment to the second media sink via the second communication medium and a second one or more time periods for the second media sink to respond to the media source via the first communication medium;
    aggregate the first synchronization information from the second media sink with second synchronization information indicative of a third one or more time periods for the media source to transmit the media segment to the first media sink via the second communication medium and a fourth one or more time periods for the first media sink to respond to the media source via the first communication medium; and
    forward, with the first communication interface via the first communication medium, the first synchronization information from the second media sink to the media source in the aggregated first and second synchronization information.

2. The system of claim 1, wherein the second one or more time periods are subsequent to the first one or more time periods.

3. The system of claim 1, wherein the first media sink is further configured to transmit a response to the media source during the fourth one or more time periods, the response comprising an acknowledgement of successfully received data from the media source during the third one or more time periods.

4. The system of claim 1, wherein the first media sink is further configured to transmit a response to the media source during the fourth one or more time periods, the response comprising a negative acknowledgement indicating an absence of successfully received data from the media source during the third one or more time periods.

5. The system of claim 1, wherein each time period is equal in duration.

6. The system of claim 1, wherein time periods of the third one or more time periods are different in duration from time periods of the fourth one or more time periods.

7. The system of claim 1, wherein the first communication interface uses less power than the second communication interface.

8. The system of claim 1, wherein the first media sink is further configured to receive, with the first communication interface via the first communication medium, a notification from the second media sink indicating the second media sink has not received the media segment within the second one or more time periods.

9. The system of claim 8, wherein the first media sink is further configured to forward, with the first communication interface via the first communication medium to the media source, the notification from the second media sink indicating the second media sink has not received the media segment within the second one or more time periods.

10. A method comprising:
    receiving, with a first communication interface of a first media sink via a first communication medium, first synchronization information from a second media sink, the first synchronization information indicative of a first one or more time period for a media source to transmit a media segment to the second media sink with a second communication interface via a second communication medium and a second one or more time periods for the second media sink to respond to the media source via the first communication medium, the second communication medium having a higher bandwidth than the first communication medium;
    aggregating, by the first media sink, the first synchronization information from the second media sink with second synchronization information indicative of a third one or more time periods for the media source to transmit the media segment to the first media sink via the second communication medium and a fourth one or more time periods for the first media sink to respond to the media source via the first communication medium; and
    forwarding, with the first communication interface of the first media sink via the first communication medium, the first synchronization information from the second media sink to the media source in the aggregated first and second synchronization information.

11. The method of claim 10, wherein the second one or more time periods are subsequent to the first one or more time periods.

12. The method of claim 10, further comprising:
transmitting, with the first communication interface of the first media sink via the first communication medium, a response to the media source during the fourth one or more time periods, the response comprising an acknowledgement of successfully received data from the media source during the third one or more time periods.

13. The method of claim 10, further comprising:
transmitting, with the first communication interface of the first media sink via the first communication medium, a response to the media source during the fourth one or more time periods, the response comprising a negative acknowledgement indicating an absence of successfully received data from the media source during the third one or more time periods.

14. The method of claim 10, wherein each time period is equal in duration.

15. The method of claim 10, wherein time periods of the third one or more time periods are different in duration from time periods of the fourth one or more time periods.

16. The method of claim 10, wherein the first communication interface uses less power than the second communication interface.

17. The method of claim 10, further comprising:
receiving, by the first media sink with the first communication interface via the first communication medium, a notification from the second media sink indicating the second media sink has not received the media segment within the second one or more time periods.

18. The method of claim 17, further comprising:
forwarding, by the first media sink with the first communication interface via the first communication medium to the media source, the notification from the second media sink indicating the second media sink has not received the media segment within the second one or more time periods.

19. A system comprising:
a first media sink comprising a first communication interface and a second communication interface,
the first communication interface in communication with a media source via a first communication medium and a second media sink via the first communication medium, the second communication interface in communication with the media source via a second communication medium, the second communication medium having a higher bandwidth than the first communication medium, wherein the first media sink is configured to:
transmit, with the first communication interface via the first communication medium, first synchronization information to the second media sink, the first synchronization information indicative of a first one or more time periods for the media source to transmit a media segment to the first media sink via the second communication medium and a second one or more time periods for the first media sink to respond to the media source via the first communication medium,
wherein the second media sink is configured to:
aggregate the first synchronization information from the first media sink with second synchronization information indicative of a third one or more time periods for the media source to transmit the media segment to the second media sink via the second communication medium and a fourth one or more time periods for the second media sink to respond to the media source via the first communication medium; and
forward, with the first communication interface via the first communication medium, the first synchronization information from the first media sink to the media source in the aggregated first and second synchronization information; and
wherein the first media sink is further configured to:
transmit, with the first communication interface via the first communication medium, a notification to the second media sink indicating the first media sink has not received the media segment within the second one or more time periods,
wherein the second media sink is further configured to forward, to the media source, the notification indicating the first media sink has not received the media segment within the second one or more time periods.

20. The system of claim 19, wherein the first communication interface uses less power than the second communication interface.

* * * * *